(12) United States Patent
Schneider

(10) Patent No.: US 6,987,223 B2
(45) Date of Patent: Jan. 17, 2006

(54) HEAT SINK FOR SILICON THERMOPILE

(75) Inventor: Philip K. Schneider, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 491 days.

(21) Appl. No.: 10/229,609

(22) Filed: Aug. 28, 2002

(65) Prior Publication Data

US 2004/0040592 A1   Mar. 4, 2004

(51) Int. Cl.
H01L 35/28   (2006.01)

(52) U.S. Cl. ........................... 136/225; 136/224

(58) Field of Classification Search ......... 136/200–242
See application file for complete search history.

(56) References Cited

U.S. PATENT DOCUMENTS

| | | | | |
|---|---|---|---|---|
| 4,111,717 A | * | 9/1978 | Baxter | 136/214 |
| 4,251,290 A | * | 2/1981 | Gomez | 136/206 |
| 5,059,543 A | * | 10/1991 | Wise et al. | 438/54 |
| 5,309,979 A | | 5/1994 | Brauer | |
| 5,393,351 A | * | 2/1995 | Kinard et al. | 136/225 |
| 5,396,404 A | | 3/1995 | Murphey et al. | |
| 5,504,653 A | | 4/1996 | Murphey et al. | |
| 5,841,634 A | | 11/1998 | Visser | |
| 6,422,307 B1 | | 7/2002 | Bhatti et al. | |
| 6,424,529 B2 | | 7/2002 | Eesley et al. | |
| 6,424,531 B1 | | 7/2002 | Bhatti et al. | |
| 6,591,897 B1 | | 7/2003 | Bhatti et al. | |
| 6,615,910 B1 | | 9/2003 | Joshi et al. | |
| 6,615,911 B1 | | 9/2003 | Bhatti et al. | |

* cited by examiner

*Primary Examiner*—Nam Nguyen
*Assistant Examiner*—Jeffrey T Barton
(74) *Attorney, Agent, or Firm*—Stefan V. Chmielewski

(57) ABSTRACT

A thermopile structure containing improved heat sinks for thermocouples in the detectors is described. The heat sinks are provided without additional processing. The heat sinks are added by using "dummy traces" to the polysilicon mask. The "dummy traces" act as heat sinks to transfer of thermal energy from the narrow metallic traces used in the thermocouple. The "dummy traces" are not electrically connected to the thermopile, therefore they do not affect the electrical resistance of the thermopile. Also, the "dummy trace" does not add significant mass to the thermopile/membrane system; therefore they do not adversely affect the thermal conductance of the system.

11 Claims, 6 Drawing Sheets

HEAT SINK FOR SILICON THERMOPILE

BACKGROUND OF THE INVENTION

1. Technical Field

The invention relates generally to detector devices, methods for making the same, and methods for using the same. In particular, the invention relates to a thermopile infrared detector, a thermopile infrared detector array, and a method of manufacturing and using the same. Specifically, the invention relates to a thermopile infrared detector containing improved heat sinks for thermocouples in the detectors.

2. Background of the Invention

Thermopile infrared detectors are being implemented in consumer and automotive applications due to their low cost and relatively simple process technologies. A thermopile is a set of n thermocouples connected in parallel thermally and in series electrically.

A thermocouple converts the thermal difference over its two junctions into a voltage difference. By heating a junction between two conductors, a temperature difference between the junction and a portion located away from the junction is produced, thereby generating a diffusion current. A reverse electromotive force (called the Seebeck voltage) is produced to compensate for the diffusion current. By measuring the Seebeck voltage, the temperature difference between the two ends of the thermocouple can be obtained.

The value of the Seebeck voltage is determined from the product of the temperature difference between the two ends of the thermocouple and the Seebeck coefficient of the two conductors forming the thermocouple. The thermally generated voltage can be amplified by connecting plural pairs of thermocouples in series to form a thermopile. Therefore, the Seebeck voltage of the thermopile is equal to a value that is obtained from the product of the Seebeck voltage of a single thermocouple and the number of the thermocouples in series.

FIG. 1 is a schematic illustration showing a conventional thermopile infrared detector array. Only one complete thermopile detector 10 is shown in FIG. 1. As depicted in FIG. 1, the thermopile detector 10 includes a substrate 100 and a suspending membrane 101 that is formed on the substrate 100 with a plurality of thermocouples 102. A hot junction 103 is located in a middle portion of the suspending membrane 101, while a cold junction 104 is located in a peripheral portion of the suspending membrane 101 attached to the substrate 100 that acts as a heat reservoir. A plurality of etching windows 105 are formed on the suspending membrane 101. A polysilicon sacrificial layer (not shown) under the suspending membrane 101 can be etched via the etching windows 105 to construct a suspending structure. The structure of the thermopile detector 10 will be better understood with reference to FIG. 2, which is a cross-section view taken along a line 2—2 of FIG. 1.

As depicted in FIG. 2, the thermopile detector 10 includes a substrate 100 and a suspending membrane 101. The substrate 100 includes an integrated circuit 107. Typically, a cavity 106 is formed between the suspending membrane 101 and the substrate 100. The suspending membrane 101 generally includes a first dielectric layer 108, a P-type polysilicon 102a, a second dielectric layer 109, an N-type polysilicon 102b, a third dielectric layer 110, and a metallic wiring 102c. The metallic wiring 102c connects the P-type polysilicon 102a with the N-type polysilicon 102b. A thermocouple 102 is composed of the P-type polysilicon 102a, the N-type polysilicon 102b, and the metallic (i.e., aluminum) wiring 102c. The regions of both the hot junction 103 and the cold junction 104 are also shown in this figure.

Thus, the thermopile structure uses several polysilicon-aluminum thermocouples connected in series to create a thermopile array. However, the silicon substrate has a high thermal conductivity, making it difficult to maintain a large temperature gradient. Therefore, the membrane, with a high thermal resistance, is used to thermally isolate the sensing element from the bulk of the silicon wafer resulting in very low heat capacity. The thermoelectric materials are supported on the membrane over the cavity in the silicon substrate, maximizing the thermal isolation of the thermocouple junctions from the substrate.

Typical thermopile configurations are arranged in squares with equal numbers of thermocouples on each side. Each thermocouple typically contains a pair of traces: an aluminum trace and a polysilicon trace. However, this results in outer aluminum traces with a polysilicon trace adjacent only one side, e.g., a polysilicon trace is not on both sides of the aluminum trace. The adjacent polysilicon traces have a significantly larger mass than the aluminum traces, thereby aiding in the transfer of excess heat from the aluminum traces during transient thermal conditions.

The thermopile is highly sensitive to Electrically Fast Transients (EFT)/Electrostatic Discharge (ESD). This sensitivity occurs because the aluminum traces that make up one leg of each thermocouple are very narrow in width. This results in less mass, thus lowering the amount of heat energy required to melt the trace. Therefore, the aluminum trace has low power dissipation capabilities, limiting the amount of energy that may be imparted to the thermopile without causing failure.

Since the membrane has a high thermal resistance, the aluminum traces cannot conduct the excess heat energy to the membrane. This also limits the ability of the outer aluminum traces to conduct transient heat. Therefore, the aluminum lines will fuse due to Joule heating at lower ESD voltages. The failure mechanism allows excessive buildup of temperature and heat, leading to electromigration of thermally-induced stress of the aluminum traces.

One way to overcome this problem is to make the aluminum traces wider. Larger aluminum widths, however, will have an adverse effect on the thermal conductance and the electrical resistance. This adversely effects the operation of the thermopile.

SUMMARY OF THE INVENTION

The invention includes a thermopile structure containing improved heat sinks for thermocouples in the detectors. The heat sinks are provided without additional processing. The heat sinks are added by using "dummy traces" to the polysilicon mask. The "dummy traces" act as heat sinks to transfer of thermal energy from the narrow metallic traces used in the thermocouple. The "dummy traces" are not electrically connected to the thermopile, therefore they do not affect the electrical resistance of the thermopile. Also, the "dummy trace" does not add significant mass to the thermopile/membrane system; therefore they do not adversely affect the thermal conductance of the system.

The invention includes a thermocouple array containing a series of thermocouples, the array comprising a heat sink on one side of the array. The invention also includes a thermocouple array comprising: a first thermocouple on a first end of the array, the first thermocouple containing a first conductive trace at the first end; a second thermocouple on a second end of the array, the second thermocouple containing a second conductive trace on the second end; and a heat sink adjacent the first end of the array. The invention further includes a thermocouple array comprising: a first thermocouple on a first end of the array, the first thermocouple containing a first conductive trace at the first end; a second thermocouple on a second end of the array, the second thermocouple containing a second conductive trace on the second end; and a heat sink adjacent the first end of the array, the heat sink comprising a dummy trace substantially similar to the second conductive trace.

The invention also includes devices containing thermocouples arrays. The invention includes a thermopile containing a plurality of thermocouple arrays, wherein a first array of the plurality comprises a heat sink on one end of the array. A thermopile containing a plurality of thermocouple arrays, wherein a first array of the plurality comprises: a first thermocouple on a first end of the first array, the first thermocouple containing a first conductive trace at the first end; a second thermocouple on a second end of the first array, the second thermocouple containing a second conductive trace on the second end; and a heat sink adjacent the first end of the array. The invention also includes a detector containing a thermopile with a plurality of thermocouple arrays, wherein a first array of the plurality comprises a heat sink on one end of the array. The invention further includes a detector containing a thermopile with a plurality of thermocouple arrays, wherein a first array of the plurality comprises: a first thermocouple on a first end of the first array, the first thermocouple containing a first conductive trace at the first end; a second thermocouple on a second end of the first array, the second thermocouple containing a second conductive trace on the second end; and a heat sink adjacent the first end of the array.

The invention also includes methods for making such thermocouples arrays and devices containing such arrays. The invention includes a method for making a thermocouple array comprising: providing a substrate with a membrane thereon; and providing a thermocouple array containing a series of thermocouples on the membrane, the array comprising a heat sink on one side of the array. The invention further includes a method for making a thermocouple array comprising: providing a substrate with a membrane thereon; providing a thermocouple array on the membrane with the array having a first thermocouple with a first conductive trace on a first end of the array, the array also having a second thermocouple with a second conductive trace on a second end of the array; and providing a heat sink adjacent the first end of the array. The invention even further includes a method for making a thermopile containing a thermocouple array comprising: providing a substrate with a membrane thereon; and providing a thermopile with a thermocouple array containing a series of thermocouples on the membrane, the array comprising a heat sink on one side of the array. The invention also includes a method for making a thermopile containing a thermocouple array comprising: providing a substrate with a membrane thereon; providing a thermopile with thermocouple array on the membrane, the array having a first thermocouple with a first conductive trace on a first end of the array, the array also having a second thermocouple with a second conductive trace on a second end of the array; and providing a heat sink adjacent the first end of the array. The invention further includes a method for making a detector containing a thermopile with a plurality of thermocouple arrays, the method comprising: providing a substrate with a membrane thereon; and providing a thermopile with a first thermocouple array on the membrane, the array comprising a heat sink on one side of the first array. The invention finally includes a method for making a detector containing a thermopile with a plurality of thermocouple arrays, the method comprising: providing a substrate with a membrane thereon; providing a thermopile with a first thermocouple array on the membrane, the first array having a first thermocouple with a first conductive trace on a first end, the array also having a second thermocouple with a second conductive trace on a second end; and providing a heat sink adjacent the first end of the array.

BRIEF DESCRIPTION OF THE DRAWINGS

The invention will now be described, by way of example, with reference to the accompanying drawings, in which:

FIGS. 1–6 illustrate specific aspects of the invention and are a part of the specification. Together with the following description, the Figures demonstrate and explain the principles of the invention and are views of only particular—rather than complete—portions of the invention.

DESCRIPTION OF THE PREFERRED EMBODIMENT

The following description discloses specific details in order to provide a thorough understanding of the invention. The skilled artisan will understand, however, that the invention can be practiced without employing these specific details. Indeed, the invention can be practiced by modifying the illustrated devices and methods and can be used in conjunction with devices and methods conventionally used in the industry. For example, the invention is described below for thermopiles that are used as detectors, but the invention could be modified to be used in other integrated circuit devices, sensors, silicon MEMS devices, or micro-opto-electro-mechanical-system (MEOMS).

Generally, the invention adds a dummy trace to any portion of a thermopile where an additional heat sink is needed. In the aspect of the invention described below, the dummy trace is added to the end of a thermocouple array where both sides of an aluminum trace are not adjacent a polysilicon trace. The dummy trace, however, can be used in other areas and locations of the thermopile as needed. For example, in another aspect of the invention the dummy traces could be added proximate the ends of the thermocouples at the edge of the membranes. In yet another example, the dummy traces could be added located to electrical interconnects. Indeed, as the design and configuration of the thermocouples change within the thermopile, the location of the dummy trace could change correspondingly.

Figure 1:
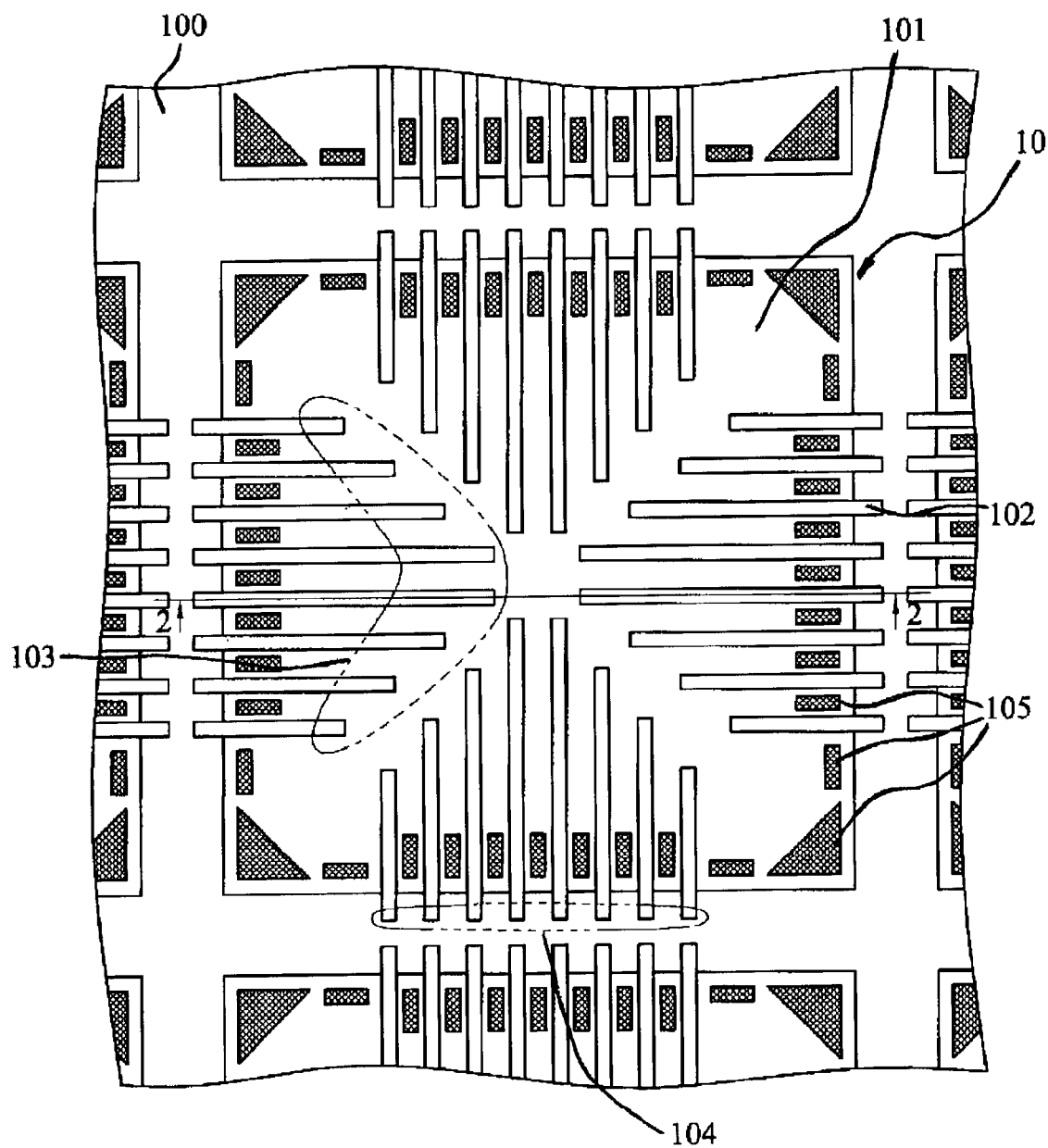
FIGS. 1 and 2 illustrate conventional devices known in the art.
Figure 2:
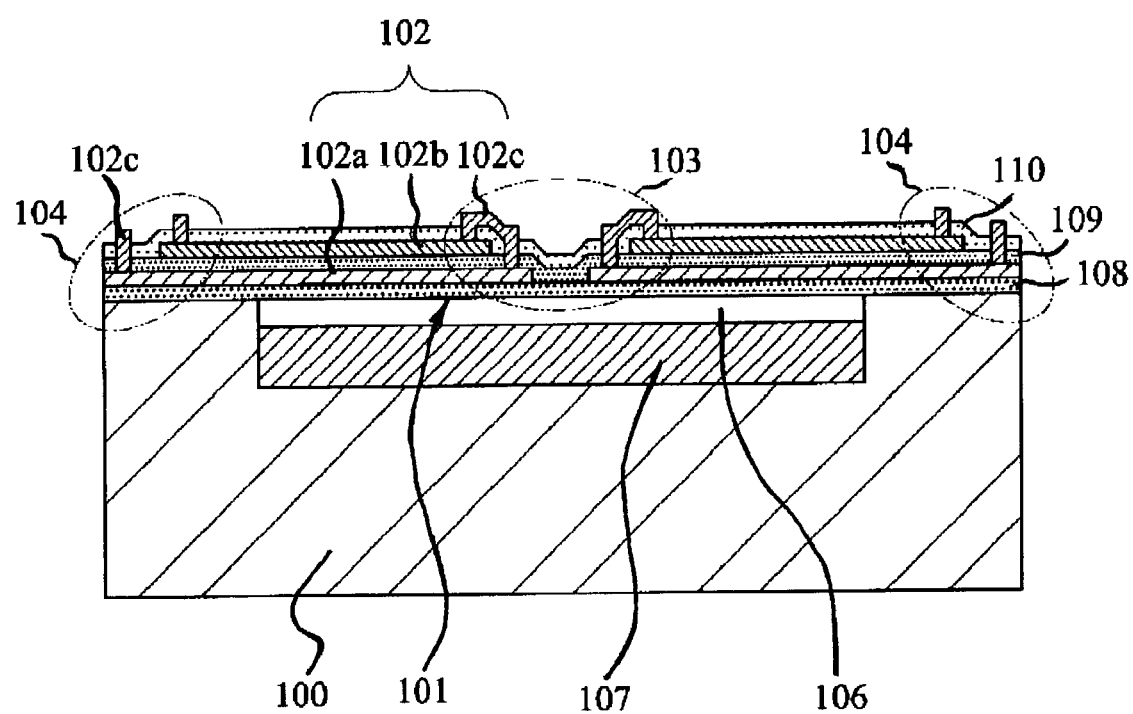
Figure 3:
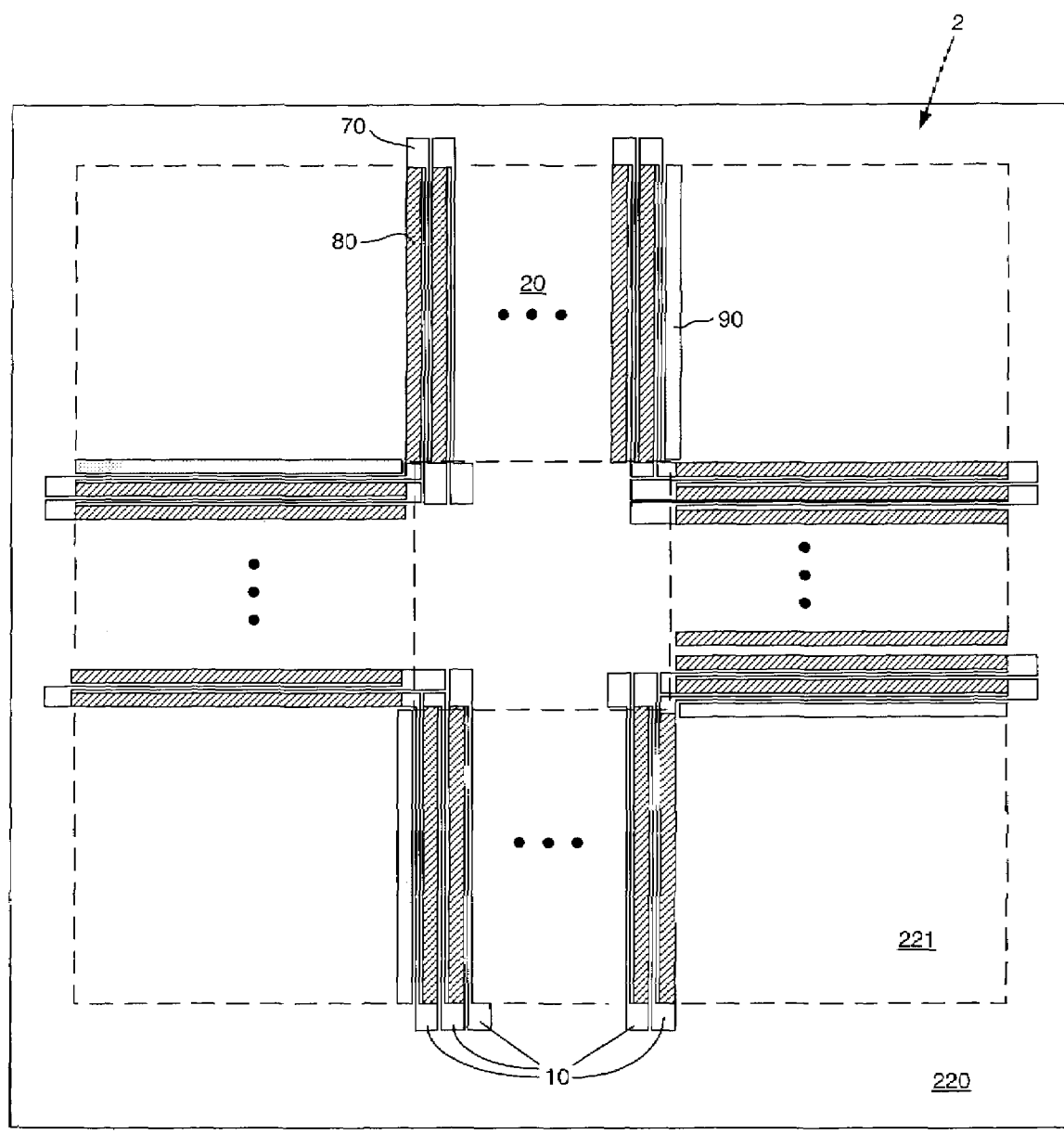
FIG. 3 illustrates a top view of a device according to one aspect of the invention.

FIG. 3 illustrates one aspect of the thermopile of the invention. In FIG. 3, the thermopile 2 is located on membrane 221 on substrate 200. The thermopile 2 is depicted with a generally rectangular configuration. Other configurations—both shape of thermopile and configuration of thermocouples therein—can be employed in the invention.

Any suitable substrate can be employed in the present invention. Suitable substrates include silicon wafers, an epitaxial Si layer, bonded wafers such as used in silicon-on-insulator (SOI) technologies, and/or amorphous silicon layers, all of which may be doped or undoped. In one aspect of the invention, the substrate 200 is a bulk silicon wafer with a thickness ranging from about 400 to about 500 microns.

Figure 6:
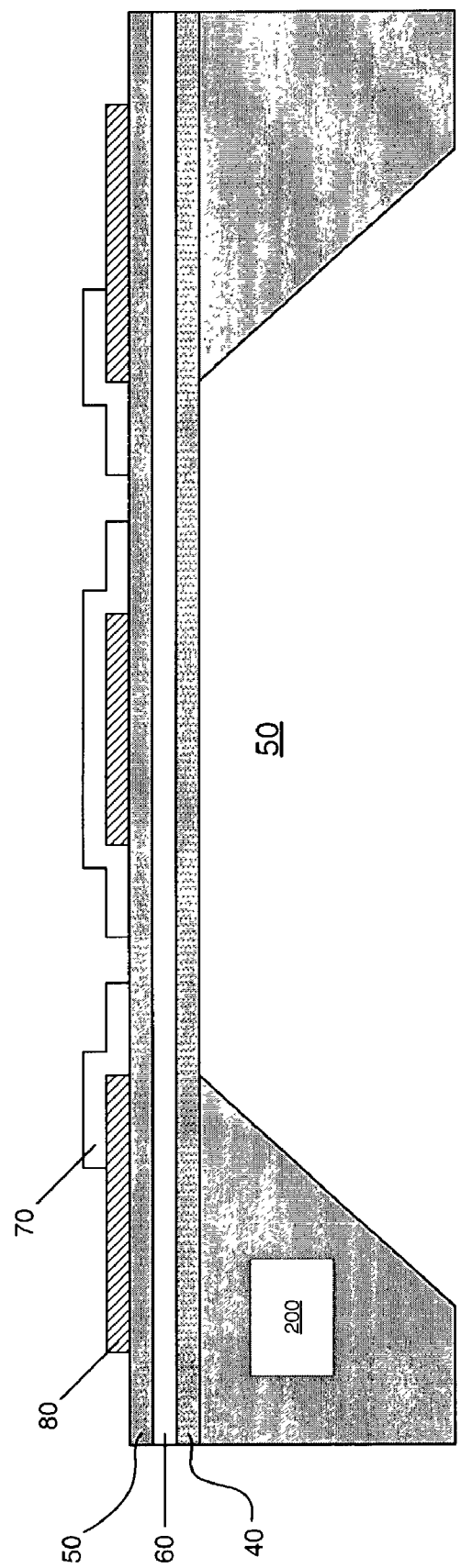
FIG. 6 depicts a side view of a device according to one aspect of the invention.

Substrate 220 contains a diaphragm. The diaphragm serves to provide a high thermal resistance, to isolate the thermocouple "hot" junctions from the bulk silicon (heat sink). Any suitable diaphragm serving this function can be used in the invention. In one aspect of the invention, the diaphragm 50 depicted in FIG. 6 is used in the invention. The shape and the size of the diaphragm can be varied according to the function described immediately above. In the aspect of the invention illustrated in FIG. 6, the diaphragm has a thickness ranging from about 0.5 $\mu$m to about 3.0 $\mu$m, a width of about 0.1 mm to about 3.0 mm, and a sidewall slope ranging from about 53° to about 54.7°.

Figure 5:
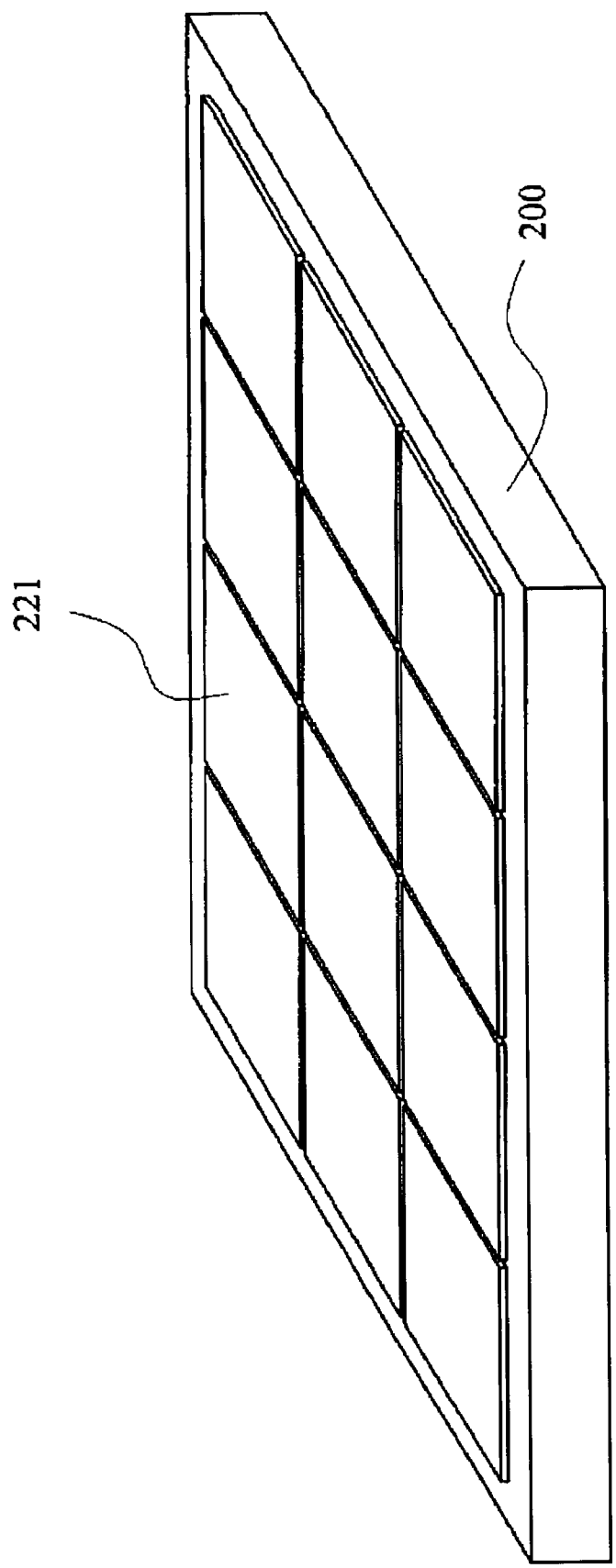
FIG. 5 illustrates a partially-completed device in one aspect of the invention.

As illustrated in FIG. 5, substrate 200 has an array of suspending membranes 221 formed thereon. Only a single membrane 221 is illustrated in FIG. 3 (by the dotted line). The membrane, with a high thermal resistance, is used to thermally isolate the sensing element of the thermopile (described below) from the substrate 200. Any membrane known in the art serving this function can be used in the invention. In one aspect of the invention, the membrane 221 is a series of layers. This series of layers contains a sandwich of dielectric layers 40, 50, and 60. The thickness of the membrane in one aspect of the invention ranges from about 0.5 to about 3.0 microns.

The first dielectric layer 40, the second dielectric layer 50, and the third dielectric layer 60 can be made of any known dielectric material known in the art, including silicon oxide, silicon nitride, silicon oxynitride, or silicon carbide. The dielectric layers can be made of the same material or a different material. In one aspect of the invention, both of the outer dielectric layers (40 and 50) are made of the same material. In this aspect of the invention, both outer dielectric layers are made of silicon oxide ($SiO_2$). The thickness of the dielectric layers in one aspect of the invention can range from about 2000 to about 7000 angstroms.

In one aspect of the invention, the inner dielectric layer 60 is made of silicon nitride ($Si_3N_4$). The thickness of the dielectric layer 60 in one aspect of the invention can range from about 2000 to about 3000 angstroms.

Located on the membrane 221 is a series 20 of thermocouples 10 (with the dots representing a plurality of thermocouples). As noted above, the thermocouple converts the thermal difference over its two junctions into a voltage difference. Any thermocouple known in the art serving that function can be employed in the invention. The number of thermocouples present depends on desired output voltage (sensitivity), but typically ranges from 10 to about 200 in one aspect of the invention.

In one aspect of the invention, the individual thermocouples comprise a first conductive trace 70 and a second conductive trace 80. The first and second conductive traces can be made of any electrically conducting material known in the art, including metals, metal compounds, and metal alloys, combinations thereof, and polysilicon. In one aspect of the invention, the first conductive layer comprises aluminum and the second conductive material comprises polysilicon.

The sizes and shapes of the first and second conductive traces can be any known in the art allowing them to function as a thermocouple. In one aspect of the invention, the first and second traces are configured as depicted in FIG. 3. In this aspect of the invention, the length of the first conductive trace can range from about 1.0 mm to about 2.0 mm and the width can range from about 2 $\mu$m to about 5 $\mu$m. The length of the second conductive trace can range from about 0.5 mm to about 2.0 mm and the width can range from about 50 $\mu$m to about 70 $\mu$m.

Figure 4:
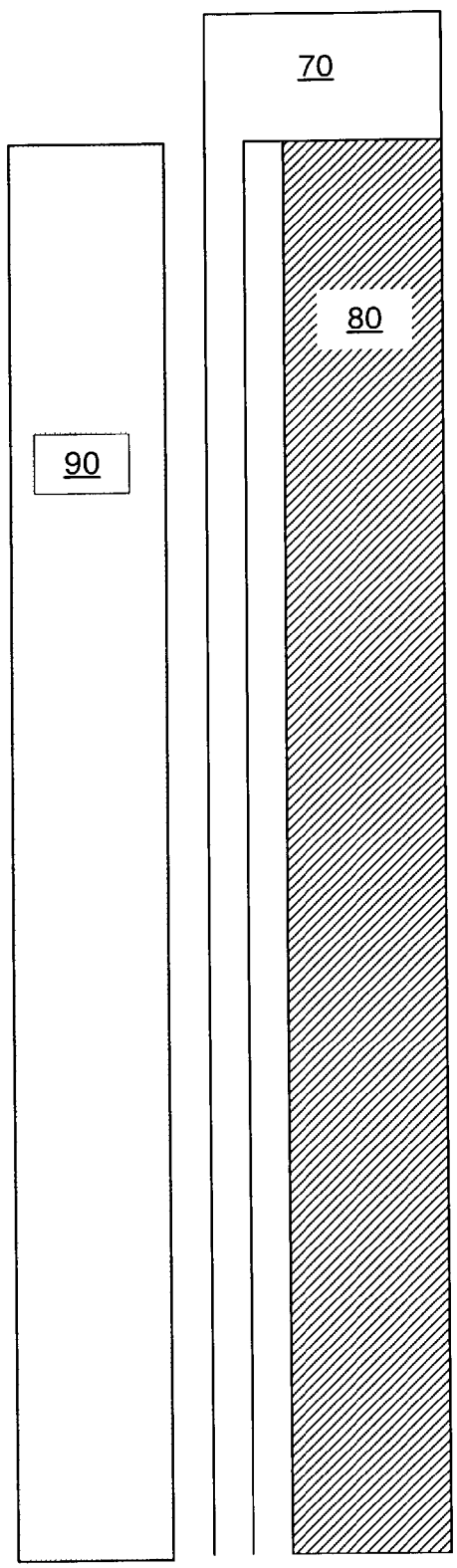
FIG. 4 illustrates a close-up of the device according to one aspect of the invention.

Based on the configuration of the thermopile in FIG. 3, each series 20 of thermocouples contains a first conductive trace on the end that has a second conductive trace adjacent only a single side of the trace. The remainder of the first conductive traces have a second conductive trace on both sides. This causes the problems described above. To reduce such problems, the invention contains a dummy trace 90 adjacent that "exposed" side of the first conductive trace. See FIG. 4 which is a close-up of the "end" of series 20 and the dummy trace 90 located near the first conductive trace 70.

The dummy trace 90 can be any configuration and can be made of any material that will act as a heat sink, e.g., act as a thermal conductor for the first conductive trace. In one aspect of the invention, the dummy trace is configured similar to the second conductive trace and made of the same material. As described below, this similarity provides a very easy method of manufacturing the dummy trace.

In another aspect of the invention, the dummy trace can be made of any thermally conductive material. Such materials include polysilicon, aluminum, and gold. The configuration of the dummy trace need not be the same width or length as the first conductive trace. Indeed, the dummy trace could be a non-continuous layer(s), could be a plurality of layers on top of (or by the side of) each other, or any other combination that would act as a heat sink The devices of the invention illustrated in FIGS. 3 and 4 can be made using any suitable processing know in the art, including the process described below. Referring to FIG. 5, the process being with substrate 200. The "back" side of the substrate is then masked and etched to form the diaphragm 50. When the substrate 200 is a bulk Si substrate, the back side of substrate 200 is masked with silicon nitride and then etched with an anisotropic etchant—such as potassium hydroxide (KOH), ethylenediamine-pyrocathecol water (EDP) or tetramethylammonium hydroxide (TMAH)—until the desired depth and sidewall configuration is obtained. Then, the silicon nitride mask is removed using any washing process such as wet chemical stripping.

A plurality of suspending membranes 221 are then formed on the "front" side of substrate 200. The suspending membranes 221 are form in an array form as shown in FIG. 5. To begin the process of forming the membranes, the first dielectric layer 40 is formed. Where the substrate 200 comprises silicon and the first dielectric layer is silicon dioxide, the silicon dioxide can be formed by any suitable oxidation or deposition process. As an example of the oxidation process, the silicon-comprising substrate could be oxidized in an $O_2$ atmosphere for about 20 to about 70 minutes at temperature ranging from about 900° C. to about 1150° C. For the deposition process, any suitable chemical vapor deposition (CVD) process can be used. For example, the substrate 200 can be heated in a silane gas ($SiH_4+O_2$) atmosphere at a temperature of about 400° C. to 450° C. for about 20 to about 70 minutes until the desired thickness is obtained.

The second dielectric layer 60 is then deposited using any suitable deposition process, such as a CVD process. Where the conducting layer 60 is silicon nitride ($Si_3N_4$), it is deposited using any low pressure CVD (LPCVD) process. For example, the $Si_3N_4$ could be deposited by heating the wafer in an atmosphere of dichlorosilane ($SiH_2Cl_2$) and ammonia ($NH_3$) at a temperature of 700° C. to 900° C. for about 90 to 100 minutes until the desired thickness is obtained.

Next, the third dielectric layer 50 is deposited using any suitable deposition process. Where the third dielectric layer is silicon dioxide, it can be deposited by any CVD process similar to the process used to deposit the first silicon dioxide dielectric layer 40.

Next, the materials for the thermocouples 10 are deposited. As depicted in FIG. 6, the second conductive layer is deposited by any suitable process, such as a CVD process or a sputtering process. Where the second conductive layer 80 is polysilicon, it is deposited using any LPCVD process. For example, the polysilicon could be deposited by heating in a 100% silane gas ($SiH_4$) atmosphere for about 50 to about 60 minutes at a temperature of about 630° C.

Then the second conductive layer is patterned using any suitable process that will remove the unnecessary portions and leave only the traces 80 needed for the thermocouples. In one aspect of the invention, the second conductive layer is masked with photoresist and then etched with chlorine ($Cl_2$) until only the traces 80 are left. Then, the photoresist mask is removed using any washing process such as wet chemical stripping.

Next, the material for the first conductive layer is next deposited. The first conductive layer can be deposited by any suitable process, such as a CVD process or a sputtering process. Where the first conductive layer 60 is aluminum, it is deposited using any sputtering process. For example, the aluminum could be deposited by low power DC-magnetron sputtering in an Argon atmosphere for about 10 minutes at a temperature of about 27° C.

Then, the first conductive layer is patterned by any suitable process that will remove the unnecessary portions and leave traces 70 needed for the thermocouples 10. In one aspect of the invention, the first conductive layer is masked with photoresist and then etched with boron trichloride ($BCl_3$) and chlorine ($Cl_2$) until only the traces 70 are left. Then, the photoresist mask is removed using any washing process such as dry plasma stripping.

Finally, the continuous membrane layer is separated into the array shown in FIG. 5. Any suitable patterning process known in the art can be employed to form the membrane array. In one aspect of the invention, the thermopiles are masked with photoresist and then etched with $CF_4+O_2$ until the channels open between the membrane arrays illustrated in FIG. 5 are formed. Then, the photoresist mask is removed using any washing process such as dry plasma stripping followed by an acetone soak.

Further processing as known in the art can then be used to finish the remainder of the infrared detector. For example, chip dicing, die attach to a TO-transistor header, wire bonding, hermetic seal with a transitor cap with an integral IR filter, and final inspection can be used to finish the devices and enable them for placement in electronic detecting and sensing devices.

Using this process, little additional processing is necessary to form the device of the invention. The only additional processing necessary is the minor alteration in the patterning for the second conductive layer to add a single additional trace on the end of every series 20. This minor alteration would only involve configuring the mask used in this patterning to contain an extra slot for the dummy trace, e.g., instead of having x slots for x traces, the mask would have x+1 slots for x+1 traces.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A thermocouple array, comprising:
    a first thermocouple on a first end of the array, the first thermocouple containing a first conductive trace at the first end;
    a second thermocouple on a second end of the array, the second thermocouple containing a second conductive trace on the second end; and
    a heat sink adjacent the first end of the array, wherein said heat sink is a dummy trace substantially similar in size and shape to the second conductive trace.

2. The array of claim 1, wherein the heat sink comprises the same material as the second conductive trace.

3. A thermopile containing a plurality of thermocouple arrays, wherein a first array of the plurality comprises:
    a heat sink on one end of the array;
    a first thermocouple with a first conductive trace at the one end and the heat sink is located adjacent the first conductive trace; and
    a second conductive trace and wherein the heat sink is a dummy trace substantially similar to the second conductive trace.

4. A thermopile containing a plurality of thermocouple arrays, wherein a first array of the plurality comprises:
    a first thermocouple on a first end of the first array, the first thermocouple containing a first conductive trace at the first end;
    a second thermocouple on a second end of the first array, the second thermocouple containing a second conductive trace on the second end; and
    a heat sink adjacent the first end of the array, wherein said heat sink is a dummy trace substantially similar in shape and size to the second conductive trace.

5. A detector containing a thermopile with a plurality of thermocouple arrays, wherein a first array of the plurality comprises:
    a heat sink on one end of the array;
    a first thermocouple with a first conductive trace at the one end and the heat sink is located adjacent the first conductive trace; and
    a second conductive trace and wherein the heat sink is a dummy trace substantially similar to the second conductive trace.

6. A detector containing a thermopile with a plurality of thermocouple arrays, wherein a first array of the plurality comprises:
    a first thermocouple on a first end of the first array, the first thermocouple containing a first conductive trace at the first end;
    a second thermocouple on a second end of the first array, the second thermocouple containing a second conductive trace on the second end; and
    a heat sink adjacent the first end of the array, wherein the heat sink is a dummy trace substantially similar to the second conductive trace.

7. A method for making a thermocouple array, comprising:
    providing a substrate with a membrane thereon;
    providing a thermocouple array containing a series of thermocouples on the membrane, the array comprising a heat sink on one side of the array;

providing the array with a first thermocouple having a first conductive trace at the end of the array and also having a second conductive trace; and providing the heat sink adjacent the first conductive trace wherein the heat sink is a dummy trace substantially similar to the second conductive trace.

8. The method of claim 7, including providing the heat sink during the same time as providing the thermocouple array.

9. A method for making a thermocouple array, comprising:

providing a substrate with a membrane thereon;

providing a thermocouple array on the membrane with the array having a first thermocouple with a first conductive trace on a first end of the array, the array also having a second thermocouple with a second conductive trace on a second end of the array; and providing a heat sink adjacent the first end of the array as a dummy trace substantially similar to the second conductive trace.

10. A method for making a thermopile containing a thermocouple array, comprising:

providing a substrate with a membrane thereon;

providing a thermopile with a thermocouple array on the membrane, the array having a first thermocouple with a first conductive trace on a first end of the array, the array also having a second thermocouple with a second conductive trace on a second end of the array; and providing a heat sink adjacent the first end of the array as a dummy trace substantially similar to the second conductive trace.

11. A method for making a detector containing a thermopile with a plurality of thermocouple arrays, the method comprising:

providing a substrate with a membrane thereon;

providing a thermopile with a first thermocouple array, the first array having a first thermocouple with a first conductive trace on a first end, the array also having a second thermocouple with a second conductive trace on a second end; and providing a heat sink adjacent the first end of the array as a dummy trace substantially similar to the second conductive trace.

* * * * *